United States Patent

Liao et al.

[11] Patent Number: 5,958,087
[45] Date of Patent: Sep. 28, 1999

[54] PREPARATION OF CYANINE DYE FOR HIGH DENSITY OPTICAL RECORDING DISK

[75] Inventors: Wen-Yih Liao, Taichung; Chien-Liang Huang, Taoyuan; Der-Ray Huang, Hsinchu; Don-Yau Chiang, Hsinchu Hsien; Andrew Teh Hu, Hsinchu; Hong-Ji Lee, Taoyuan Hsien; Shi-Jae Ye, Kaohsiung Hsien; Ying-Jen Kao, Taipei, all of Taiwan

[73] Assignees: Industrial Technology Research Institute; National Tsing Hua University, both of Taipei, Taiwan

[21] Appl. No.: 09/248,349

[22] Filed: Feb. 8, 1999

[30] Foreign Application Priority Data

Apr. 18, 1998 [TW] Taiwan .................................. 87106033

[51] Int. Cl.$^6$ ............................ C09B 67/32; C09B 67/34
[52] U.S. Cl. ....................... 8/644; 8/638; 8/527; 548/455
[58] Field of Search ................................ 8/638, 644, 527; 548/455; 430/270.21

[56] References Cited

U.S. PATENT DOCUMENTS 5,391,413  2/1995  Yanagisawa et al. .......... 430/270.21 X
5,731,054  3/1998  Chapman et al. ............. 430/270.14 X

*Primary Examiner*—Fiona T. Powers
*Attorney, Agent, or Firm*—Thomas, Kayden Horstemeyer & Risley, L.L.P.

[57] ABSTRACT

A cyanine dye for using in high density optical disc recording medium, having the following structure:

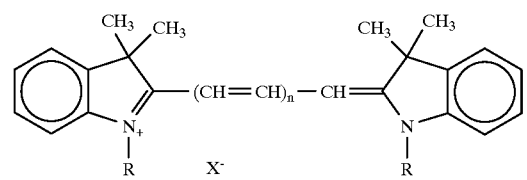

wherein R represents 4-methoxycarbonyl benzyl group, $X^-$ represents an acid anion, and n represents an integer of 1 or 2. This cyanine dye is suitable for use as a $\lambda$=450 nm~650 nm visible light-absorbing organic dye useful as a high density optical disc recording medium.

15 Claims, 3 Drawing Sheets

PREPARATION OF CYANINE DYE FOR HIGH DENSITY OPTICAL RECORDING DISK

CROSS-REFERENCE TO RELATED APPLICATION

This application claims priority benefit of Taiwan application Serial no. 87106033 filed Apr. 18, 1998, the full disclosure of which is incorporated herein by reference.

BACKGROUND OF THE INVENTION

1. Field of the Invention

The invention relates to a cyanine dye which is suitable for use as a λ=450 nm –650 nm visible light-absorbing organic dye such as DVD-R.

2. Description of the Related Art

A storage medium with higher storage density, smaller size and lower cost is extremely required now-a-days. As magnetic storage medium is not able to satisfy these requirement, optical storage material is greatly sought for as an alternative. It is found that organic dye which combines the advantages and characters of both the photosensitizer and photorecording medium, is highly developed and adopted for optoelectronic industry. The applications of organic dye include in the fields of, for example, nonlinear optical device, recording and displaying of optical disc data, photoresist, sensor and indicator for heat, light, and electron, during the transfer and storage of energy, medicine and biology, etc. The cyanine dyes mixture of this invention has high absorption coefficient in the infrared region which implies that the cyanine dye has high recording sensitivity and signal to noise ratio (S/N) value. Therefore, cyanine dyes mixture is an ideal optical memory storage material.

An organic dye, cyanine blue, was first synthesized by Greville Williams in 1856 (K. Venkataraman (ed.), The Chemistry of Synthetic Dyes, Vol. II, p.1143–1186, Acdaemic Press, New York, 1952.). In 1875, Vogel discovered that Cyanine Blue has special photosensitive properties. Therefore, cyanine blue, which was originally used as colorant turned to be a photosensitizer with higher added value. Different structures of cyanine dye have different $\lambda_{max}$ which varies from UV to IR. Therefore, cyanine blue can also serve as photosensitizer for photoresist or optical storage medium in electronic industry besides a colorant.

Cyanine dye, 3, 3'-diethyl-12-acetyl-thiatetracyanine perchlorate, was first proposed for the application in optical discs fabrication by Law et al. Discusser that (K. Y. Law, P.S. Vincett, and G. E. Johnson, Appl.Phys.Lett., 39, 718(1981)). The cyanine dye and PVAc (poly(vinyl acetate)) are first mixed and then spin-coated to form an optical recording medium. After this successful application, several kinds of cyanine were develop for optical disc applications, such as those disclosed in U.S. Pat. Nos. 5,019,476, 5,292,615, 5,328,802, 5,332,608, 5,424,171, 5,455,094 etc. As to the method of fabrication, it is found that spin coating of the dye on the substrate can shorted the process and reduce the cost as compared to the chemical vapor deposition (CVD) process; therefore spin coating is accepted as the standard procedure, and the stability if the organic dye and its solubility to organic solvent are critical factors for successful applications.

SUMMARY OF THE INVENTION

It is therefore an object of the invention to provide cyanine dye (I) with $\lambda_{max}$ in the visible light range (400 nm~700 nm) for used as high density optical disc recording medium. This cyanine dye is thermal stable for laser writing and good solubility in organic solvent. The formula of cyanine in this invention is shown as structure formula(I):

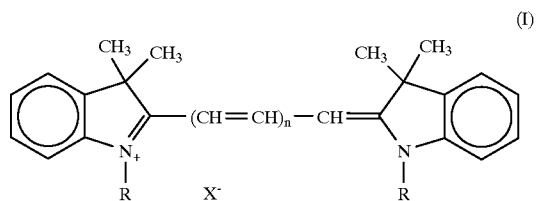

(I)

wherein R represents

d X⁻ represents an acid anion, and n represents an integer of 1 and 2. For cyanine dye (II), n=1; and for cyanine dye (III), n=2.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings, FIG. 1 shows a UV/Visible/IR absorption spectrum of the cyanine dye (II) wherein

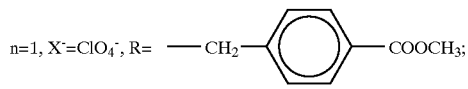

Figure 2:
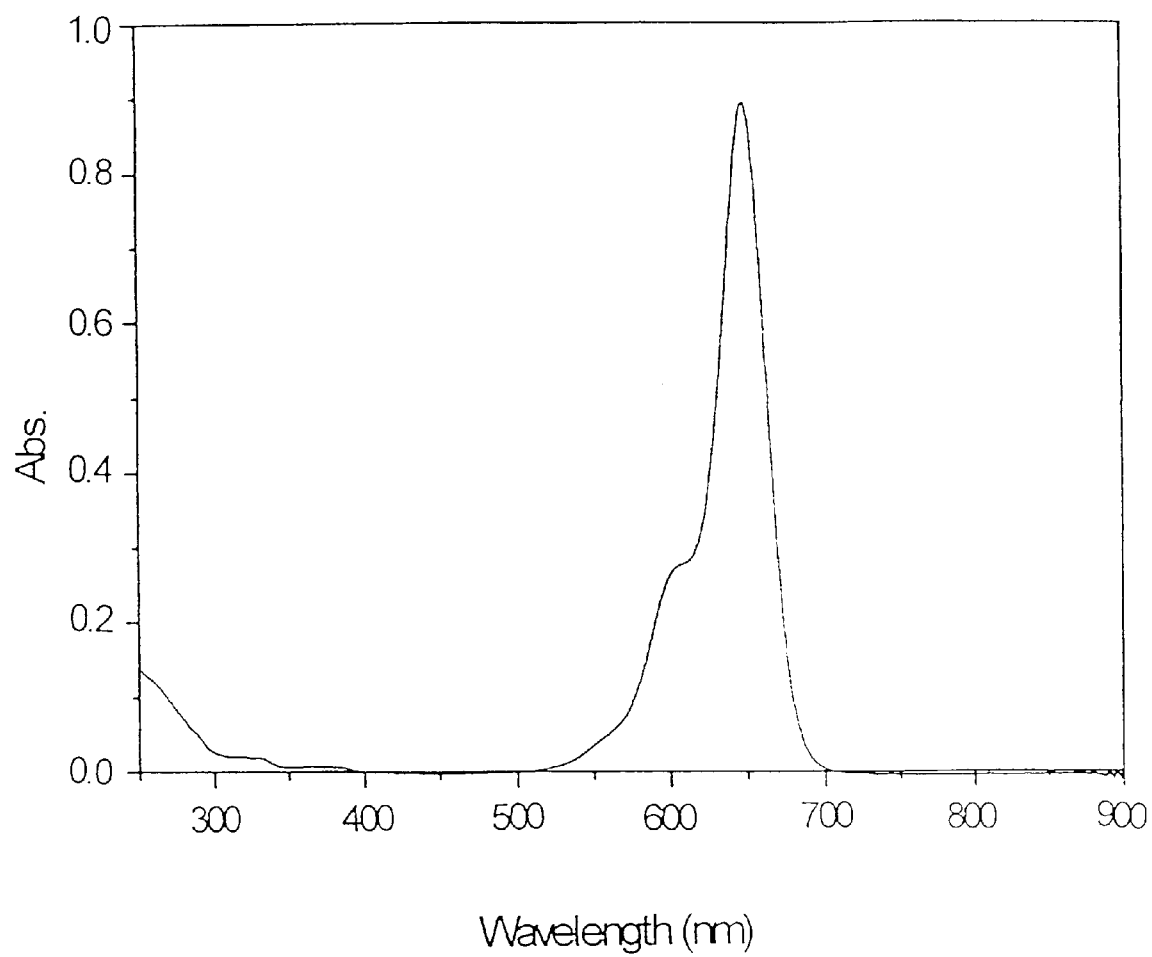

FIG. 2 shows a UV/Visible/IR absorption spectrum of the cyanine dye (III) wherein

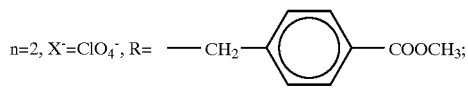

and

Figure 3:
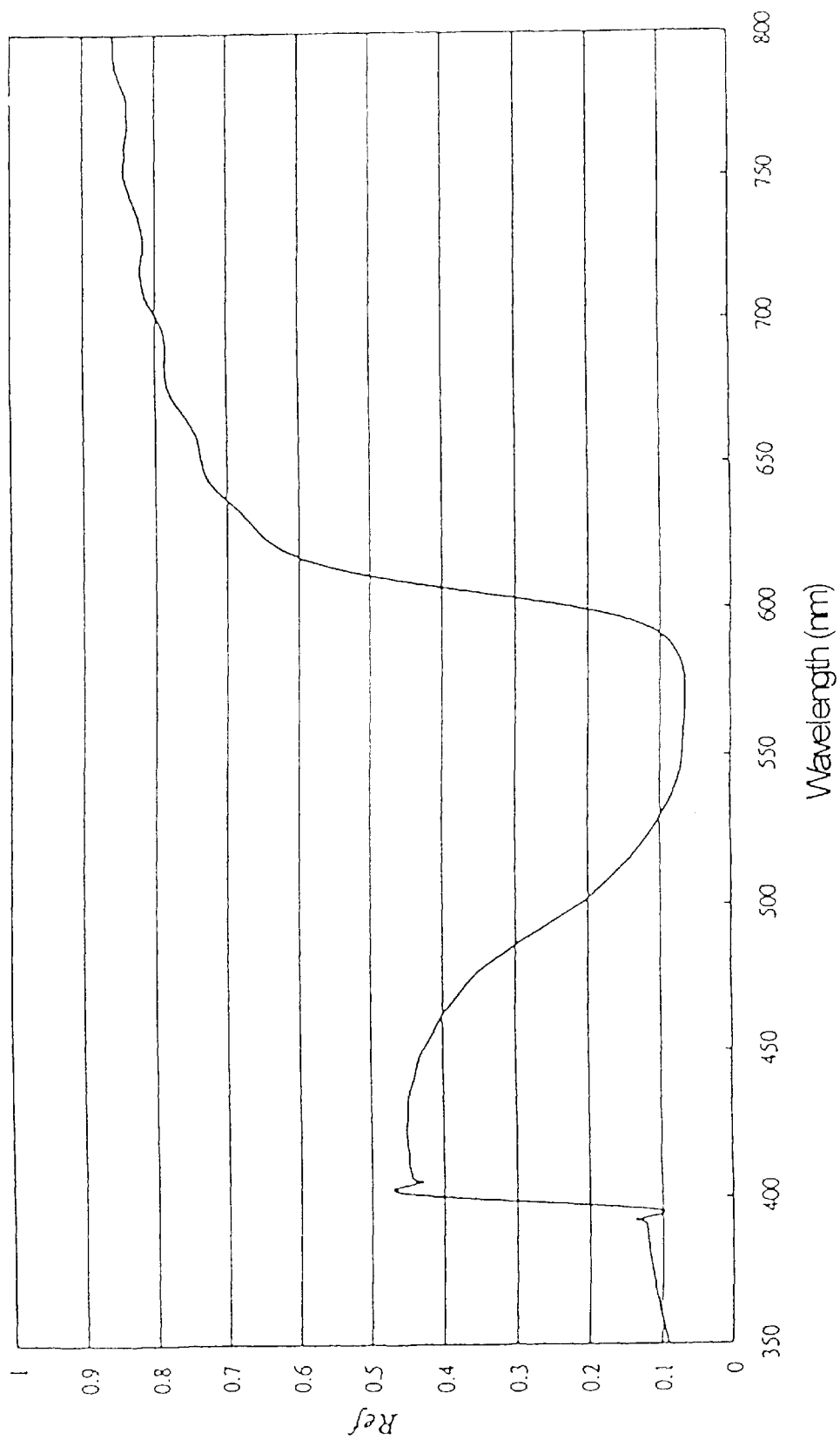

FIG. 3 shows a reflecting spectrum of the dyes mixture layer on optical recording disc with gold serving as a reflective layer.

DESCRIPTION OF THE PREFERRED EMBODIMENTS

The structural formula of cyanine dyes mixture of this invention is shown as follows:

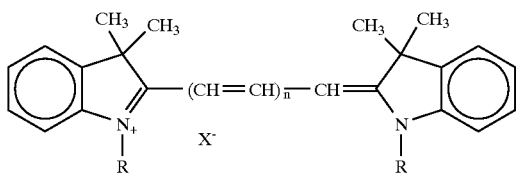

R is

X⁻ is an acid anion, and n is 1 and 2. Preferably, X⁻ is halogen anion (such as Cl⁻, Br⁻, I⁻ etc.), alkylsulfate anion (such as $CH_3SO_4^-$, $C_2H_5SO_4^-$, $n\text{-}C_3H_7SO_4^-$ etc.), arylsulfonate anion (such as

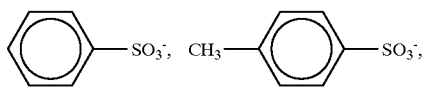

etc.) or perchlorate anion (such as $ClO_4^-$ etc.). This cyanine is thermally stable and soluble in various organic solvents.

Preparation of 1-(4"-methoxycarbonyl)benzyl-3,3-dimethyl-1'-(4"-methoxycarbonyl)benzyl-3,3-dimethyl-lindo-2:2'-trimethine perchlorate

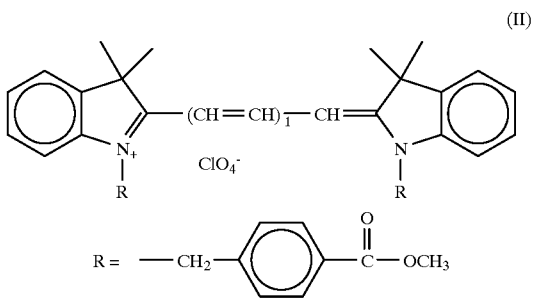

(II)

Preparation of 1-(4"-methoxycarbonyl)benzyl-3,3-dimethyl-1'-(4"-methoxycarbonyl)benzyl-3,3-dimethyl-lindo-2:2'-trimethine perchlorate includes three steps: first synthesizing the substituent of methyl(4-iodomethyl) benzoate, second, synthesizing 1-(4-methoxycarbonyl) benzyl-2,3,3-trimethyl indoleninium iodide), and then reacting with ethyl orthoformate to obtain the structure (II).

Preparation of methyl(4-iodomethyl)benzoate:

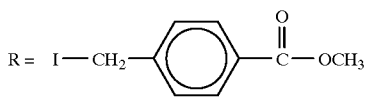

A mixed solution of methanol (0.32 g), 4-chloromethylbenzoyl chloride (1.89 g) and pyridine (0.791 g) is heated to 40° C. for three hours to give methyl(4-iodomethyl)benzoate. The latter was stirred with sodium iodide in dried acetone at 40° C. for 3 hours to give the crude material, and then the mixture is isolated by filtration. The filtrate is evaporated and recrystallized from a mixture of dichloromethane and water to give a light yellow crystals, methyl(4-iodomethyl)benzoate. The yield is 90%, mp 67° C.

Preparation of 1-(4-methoxycarbonyl)benzyl-2,3,3-trimethyl indoleninium iodide):

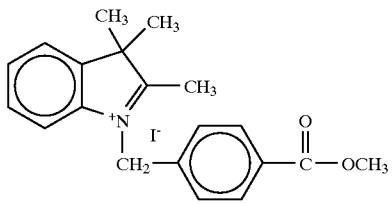

A mixed solution of methyl(4-iodomethyl)benzoate (2.76 g) and 2,3,3-trimethylindolenine(1.752 g) are heated in benzene at 80–85° C. for 6 hours. The solution is evaporated and recrystallized by ethyl acetate to give light yellow crystals. The yield is 71%, mp 109° C.

Figure 1:
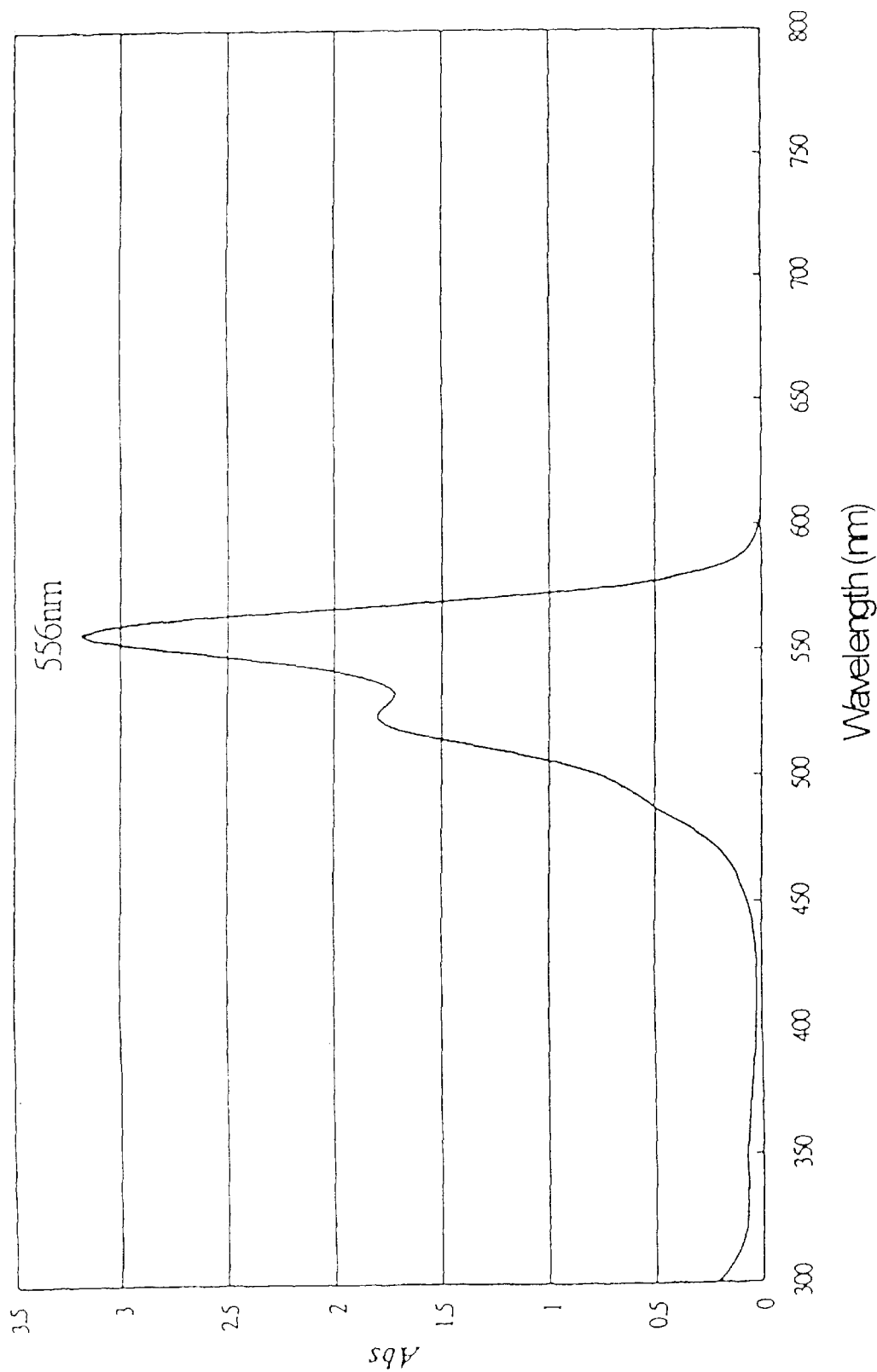

Preparation of 1-(4"-methoxycarbonyl)benzyl-3,3-dimethyl-1'-(4"-methoxycarbonyl)benzyl-3,3-dimethyl-lindo-2:2'-trimethine perchlorate (II):

A solution of 1-(4-methoxycarbonyl)benzyl-2,3,3-trimethyl indoleninium iodide) (6.16 g) and ethyl orthoformate (1.12 g) are heated in 20 ml pyridine at 100° C. for 2 hours. After cooling, the reaction mixture is poured into an aqueous solution of sodium perchlorate containing 1.41 g sodium perchlorate. The mixture is dissolved in dichloromethane solution, washed with water several times and then evaporated. The residue recrystallized from alcohol to give blue crystals of 1-(4"-methoxycarbonyl)benzyl-3,3-dimethyl-1'-(4"-methoxycarbonyl)benzyl-3,3-dimethyl-lindo-2:2'-trimethine perchlorate. The productivity is 70%, mp 266° C. FIG. 1 shows that $\lambda_{max}$(EtOH) is 556 nm.

Preparation of 1-(4"-methoxycarbonyl)benzyl-3,3-dimethyl-1'-(4"-methoxycarbonyl)benzyl-3,3-dimethyllindo-2:2'-pentamethine perchlorate

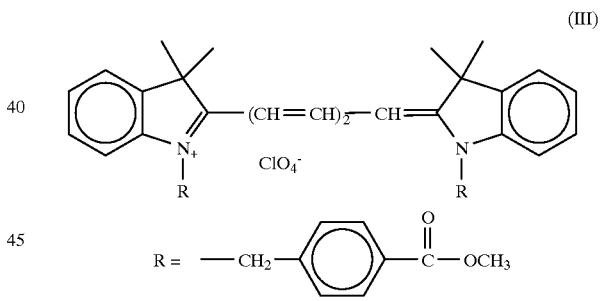

(III)

Preparation of 1-(4"-methoxycarbonyl)benzyl-3,3-dimethyl-1'-(4"-methoxycarbonyl)benzyl-3,3-dimethyl-lindo-2:2'-pentamethine perchlorate includes three steps: first synthesizing the substituent of methyl(4-iodomethyl) benzoate, second, synthesizing 1-(4-methoxycarbonyl) benzyl-2,3,3-trimethyl indoleninium iodide), and then reacting the latter compound with 3-anilinoarcylaldehyde anil.

Preparation of methyl(4-iodomethyl)benzoate:

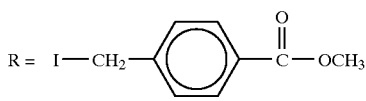

A mixed solution of methanol (0.32 g), 4-chloromethylbenzoyl chloride (1.89 g) and pyridine (0.791 g) is heated to 40° C. for three hours to give methyl(4-iodomethyl) benzoate. The latter was stirred with sodium iodide in dried acetone at 40° C. for 3 hours to give the crude material, and then the mixture is isolated by filtration. The filtrate is evaporated and recrystallized from a mixture of dichloromethane and water to give a light yellow crystals, methyl (4-iodomethyl)benzoate. The yield is 90%, mp 67° C.

Preparation of 1-(4-methoxycarbonyl)benzyl-2,3,3-trimethyl indoleninium iodide):

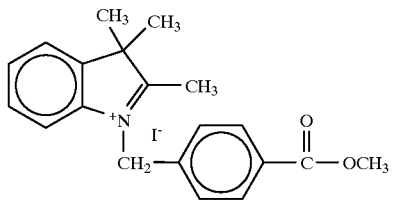

A mixed solution of methyl(4-iodomethyl)benzoate (2.76 g) and 2,3,3-trimethylindolenine(1.752 g) are heated in benzene at 80–85° C. for 6 hours. The solution is evaporated and recrystallized by ethyl acetate to give light yellow crystals. The yield is 71%, mp 109° C.

Preparation of 1-(4"-methoxycarbonyl)benzyl-3,3-dimethyl-1'-(4"-methoxycarbonyl)benzyl-3,3-dimethyl-lindo-2:2'-pentamethine perchlorate (II):

A solution of 1-(4-methoxycarbonyl)benzyl-2,3,3-trimethyl indoleninium iodide) (6.16 g) , 3-anilinoacrylaldehyde anil (2.85) and sodium acetate (1.64 g) in a 20 ml of acetic anhydride are heated at 100° C. for 2 hours. After cooling, the reaction mixture is poured into an aqueous solution of sodium perchlorate containing 1.41 g sodium perchlorate. The mixture is dissolved in dichloromethane solution, washed with water several times and then evaporated. The residue recrystallized from alcohol to give blue crystals of 1-(4"-methoxycarbonyl)benzyl-3,3-dimethyl- 1'-(4"-methoxycarbonyl)benzyl-3,3-dimethyl-lindo-2:2'-pentamethine perchlorate. The productivity is 70%, mp 201° C. FIG. 2 shows that $\lambda_{max}$(EtOH) is 648 nm.

Preparation of Optic Recording Disc

Dye(II) and dye(III) were used as optical recording media. Dye(II) and dye(III) are dissolved in 2,2,3,3-tetrafluoropropanol to make up a solution of 100 g. However, the solvent is not limited to 2,2,3,3-tetrafluoropropanol; it can be an alcohol (such as methanol, ethanol and isopropanol etc.), a ketone (such as acetone and methyl-ethyl ketone (MEK) etc.), an ether (such as ethyl ether and tetrahydrofuran etc.) or chloroform and dichloromethane. The weight percentage of dye (III) to dye (II) can be 1%–10%, and preferably 3.5%–5%. The weight percentage of dye (II) to the total make-up solutio can be 0.5%–5%, and preferably 1.3%–2%. In the preferred embodiment of this invention, 1.5 g of dye (II) and 0.075 g of dye (III) are dissolved in 2,2,3,3-tetrafluoropropanol to form a 100 g solution. The dyes are coated onto a blanket polycarbonate (PC) substrate by a spin coater, through a dipping process at 30~500 rpm for 2~10 sec, a spinning out process at 1000~3000 rpm for 10–30 sec and a baking process at 2000–5000 rpm for 10–30 sec. On the top of the dye recording layer, a reflection layer of gold or sliver, having a thickness of about 1000–2500Å, is sputtered. Finally, a protection layer of 1 μm is lacquered.

FIG.3 shows a reflecting spectrum of dyes mixture on optical recording disc. At 650 nm, the reflection rate reaches 60%. The above characters of the compact made with cyanine dyes mixture of this invention indicate that the aforementioned cyanine dyes mixture can successfully serve as high density optical disc recording media.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A cyanine dye mixture (II and III) as high density optical recording disc, having the general structural formula:

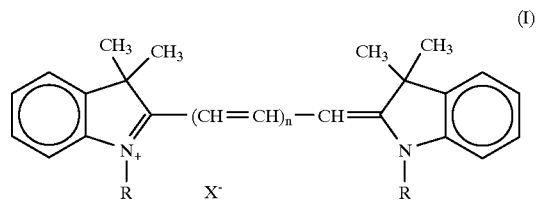

(I)

wherein R is 4-methoxycarbonyl benzyl group;

X⁻ is an acid anion; and n is 1 for cyanine dye (II) and n is 2 for cyanine dye (III).

2. The cyanine dyes mixture according to claim 1, wherein

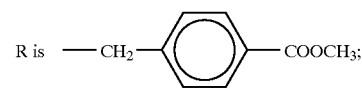

X⁻ is selected from a group consisting of halogen, alkylsulfate, arylsulfonate and perchlorate; and n is 1 for cyanine dye (II) and n is 2 for cyanine dye (III).

3. The cyanine dyes mixture according to claim 1, wherein

R is

X⁻ is ClO4⁻; and n=1 for cyanine dye (II) and n is 2 for cyanine dye (III).

4. The cyanine dye according to claim 1, wherein n is 1 for cyanine dye (II), n is 2 for cyanine dye (III) and a reflective layer for the optical disc in accordance with the cyanine dyes is selected from the group consisting of gold and silver.

5. The cyanine dyes mixture according to claim 1, wherein the weight percentage of the cyanine dye (III) to the cyanine dye (II) is 1%–10%.

6. The cyanine dyes mixture according to claim 1, wherein the weight percentage of the cyanine dye (III) to the cyanine dye (II) is in the range between 3.5%–5%.

7. The cyanine dyes mixture according to claim 1, wherein the weight percentage of the cyanine dye (II) to the total weight, including the cyanine dye (II), cyanine dye (III) and the organic solvent is 0.5%–5%.

8. The cyanine dyes mixture according to claim 1, wherein the weight percentage of the cyanine dye (II) to the total weight, including the cyanine dye (II), cyanine dye (III) and the organic solvent is in the range between 1.3%–1.7%.

9. The cyanine dyes mixture according to claim 1, wherein the cyanine dyes mixture is solubilized in alcohol.

10. The cyanine dyes mixture according to claim 1, wherein the cyanine dyes mixture is solubilized in ether.

11. The cyanine dyes mixture according to claim 1, wherein the cyanine dyes mixture is solubilized in ketone.

12. The cyanine dyes mixture according to claim 1, wherein the cyanine dyes mixture is solubilized in 2,2,3,3-tetrafluoropropanol.

13. The cyanine dyes mixture according to claim 1, wherein the cyanine dyes mixture is solubilized in chloroform.

14. The cyanine dyes mixture according to claim 1, wherein the cyanine dyes mixture is solubilized in dicholomethane.

15. The cyanine dyes mixture according to claim 1, wherein the cyanine dyes mixture is solubilized in dimethylformamide.

* * * * *